(12) United States Patent
Jang et al.

(10) Patent No.: US 10,709,989 B2
(45) Date of Patent: Jul. 14, 2020

(54) SYSTEM AND METHOD FOR ANALYZING GAME UPDATE EFFECT ACCORDING TO CHANGE OF GAMER ACTION SEQUENCE

(71) Applicant: Electronics and Telecommunications Research Institute, Daejeon (KR)

(72) Inventors: Si Hwan Jang, Daejeon (KR); Seong Il Yang, Daejeon (KR); Hyung Keun Jee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 88 days.

(21) Appl. No.: 16/151,561

(22) Filed: Oct. 4, 2018

(65) Prior Publication Data
US 2019/0209928 A1    Jul. 11, 2019

(30) Foreign Application Priority Data

Jan. 11, 2018 (KR) .................. 10-2018-0003874
Mar. 9, 2018 (KR) .................. 10-2018-0027906

(51) Int. Cl.
*A63F 13/00* (2014.01)
*A63F 13/79* (2014.01)
*A63F 13/77* (2014.01)

(52) U.S. Cl.
CPC .............. *A63F 13/79* (2014.09); *A63F 13/77* (2014.09); *A63F 2300/535* (2013.01)

(58) Field of Classification Search
None
See application file for complete search history.

(56) References Cited

U.S. PATENT DOCUMENTS 9,224,259 B1 *  12/2015  Miller .................... G07F 17/32
9,454,993 B1 *   9/2016  Lawson ............... G11B 27/102
(Continued)

FOREIGN PATENT DOCUMENTS

KR    10-2012-0095332    8/2012
KR    10-2013-0058336    6/2013
(Continued)

OTHER PUBLICATIONS

Tae-Hyung Kim et al., "A Study on Improvement of User Participation through User Created Game Contents", with English translation, Journal of Korea Game Society, vol. 17, No. 6, Dec. 2017, pp. 63-76.

(Continued)

*Primary Examiner* — Paul A D'Agostino
(74) *Attorney, Agent, or Firm* — Kile Park Reed & Houtteman PLLC

(57) ABSTRACT

Disclosed is an apparatus for analyzing a game update effect according to a change in a gamer action sequence, the apparatus including: a gamer action information collector configured to collect action information of a gamer from a game operating server that provides a gamer terminal with a game and stores the action information of the gamer therein; a gamer action information sequence identifier configured to detect an action sequence of the gamer from the collected action information of the gamer; and an update result analyzer configured to analyze an consequence on behavior of the gamer with respect to an update of a game service by comparing action sequences of the gamer detected through the gamer action information sequence identifier on the basis of a time point of the update of the game service.

20 Claims, 8 Drawing Sheets

(56) References Cited

U.S. PATENT DOCUMENTS

| | | | | |
|---|---|---|---|---|
| 2010/0331089 | A1* | 12/2010 | Priebatsch | A63F 13/12 |
| | | | | 463/42 |
| 2012/0149449 | A1* | 6/2012 | Choi | A63F 13/31 |
| | | | | 463/1 |
| 2012/0278431 | A1* | 11/2012 | Luna | G06F 9/5027 |
| | | | | 709/217 |
| 2014/0243077 | A1* | 8/2014 | Choi | A63F 13/00 |
| | | | | 463/29 |
| 2014/0274353 | A1* | 9/2014 | Benson | G06F 3/01 |
| | | | | 463/29 |
| 2015/0038233 | A1* | 2/2015 | Rom | A63F 13/42 |
| | | | | 463/42 |
| 2015/0165310 | A1* | 6/2015 | Rebh | A63F 13/10 |
| | | | | 463/29 |
| 2016/0346696 | A1* | 12/2016 | Liu | A63F 13/67 |

FOREIGN PATENT DOCUMENTS

| | | |
|---|---|---|
| KR | 10-2014-0013294 | 2/2014 |
| KR | 10-2017-0135387 | 12/2017 |

OTHER PUBLICATIONS

Gyu Young Kang, "Box and Whisker Optimize the World", Jan. 29, 2015, pp. 1-5, https://boxnwhis.kr/2015/01/29/a_b_testing_online_games.html, with English translation.

\* cited by examiner

FIG. 3

<IDENTIFICATION OF GAMER ACTION SEQUENCE BEFORE/
AFTER UPDATE>

User A

...
Seq 1.(LOGIN)->(HUNTING)->(HUNTING)->
 (ITEM SALES)->(LOGOUT)
Seq 2.(LOGIN)->(HUNTING)->(HUNTING)->(LOGOUT)
Seq 3.(LOGIN)->(HUNTING)->(DEATH)->(HUNTING)->
 (LOGOUT)

>>>>>>UPDATE>>>>>>>

...
Seq 4.(LOGIN)→ (HUNTING)→ (HUNTING)→
 (ITEM SYNTHESIS)→ (PURCHASE WITH CASH)→
 (ITEM SYNTHESIS)→ (LOGOUT)
Seq 5.(LOGIN)→ (HUNTING)→ (HUNTING)→
 (PURCHASE WITH CASH)→ (ITEM SYNTHESIS)→
 (DUNGEON HUNTING)→ (LEVEL-UP)→ (LOGOUT)
Seq 6.(LOGIN)→ (HUNTING)→ (DEATH)→
 (PURCHASE WITH CASH)→
 (WEAPON/ARMOR ENHANCEMENT)→ (LOGOUT)

User B
...

User C
...

User ...
...

<ANALYSIS OF FREQUENT OCCURRENCE ACTION SEQUENCES BEFORE/AFTER UPDATE OF GAMER>

1. 50% DECREASE IN ACTION OF SEQUENCE PATTERN OF HUNTING->DEATH
2. 30% ADDITIONAL OCCURRENCES OF ACTION SEQUENCE PATTERN OF HUNTING->PURCHASE WITH CASH->ITEM SYNTHESIS
3. ADDITIONAL OCCURRENCE OF ACTION SEQUENCE PATTERN OF PURCHASE WITH CASH->WEAPON/ARMOR ENHANCEMENT

FIG. 6

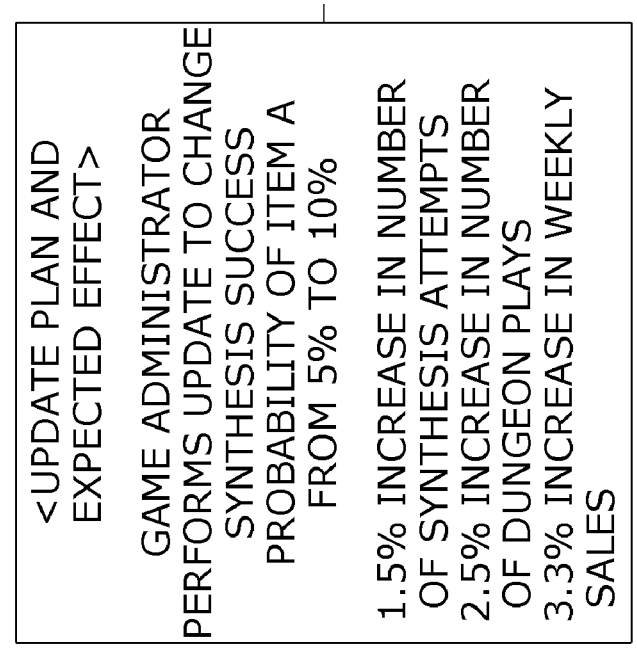

<UPDATE PLAN AND EXPECTED EFFECT>

GAME ADMINISTRATOR PERFORMS UPDATE TO CHANGE SYNTHESIS SUCCESS PROBABILITY OF ITEM A FROM 5% TO 10%

1.5% INCREASE IN NUMBER OF SYNTHESIS ATTEMPTS
2.5% INCREASE IN NUMBER OF DUNGEON PLAYS
3.3% INCREASE IN WEEKLY SALES

<OPERATION/PLANNING DATA>

- ITEM A: RARE ITEM ACQUIRED ONLY THROUGH SYNTHESIS
- SYNTHESIS METHOD: MATERIAL B + SYNTHESIS RECIPE C
- MATERIAL B: MATERIAL ONLY ACQUIRED THROUGH PURCHASE WITH CASH
- SYNTHESIS RECIPE C: MATERIAL ACQUIRED AS LOOT IN DUNGEON PLAY (HUNTING)

FIG. 7

<IDENTIFY RESULT WITH RESPECT TO
EXPECTED EFFECT OF UPDATE>

IDENTIFY NOT ONLY EXPECTED EFFECT IN
ADJUSTMENT OF SYNTHESIS PROBABILITY
BUT ALSO ADDITIONAL EFFECT DERIVED
FROM ADJUSTMENT OF SYNTHESIS PROBABILITY 1. 5% INCREASE IN NUMBER OF
   SYNTHESIS ATTEMPTS (SAME AS PREDICTION)
2. 10% INCREASE IN NUMBER OF DUNGEON
   PLAYS (TWICE GREATER THAN PREDICTION,
   FOR ACQUISITION OF ENHANCED ITEMS)
3. 6% INCREASE IN WEEKLY SALES
   (ADDITIONAL CASH CONSUMPTION FOR
   ENHANCEMENT)
4. 3% INCREASE IN ACTION OF ENHANCING
   WEAPON/ARMOR (ADDITIONAL EFFECTS
   OCCURRING FOR SUCCESS OF HUNTING)

SYSTEM AND METHOD FOR ANALYZING GAME UPDATE EFFECT ACCORDING TO CHANGE OF GAMER ACTION SEQUENCE

CROSS-REFERENCE TO RELATED APPLICATION

This application claims priority to and the benefit of Korean Patent Application No. 2018-0003874, filed on Jan. 11, 2018 and Korean Patent Application No. 2018-0027906, filed on Mar. 9, 2018, the disclosure of which is incorporated herein by reference in its entirety.

BACKGROUND

1. Field of the Invention

The present invention relates to an apparatus and method for analyzing a game update effect according to a change in a gamer action sequence, and more specifically, to a system and method for analyzing a change in an action sequence of a gamer with respect to an update in the game service.

2. Discussion of Related Art

In general, game content is subject to ongoing management and maintenance even after the launch. Accordingly, a game that was a big hit may have a downfall and a game that was sluggish may become a hit again depending on the success of an update, and thus analyzing the influence after a game service update is essential for gamer management.

As such, the conventional update of the game content is intended to enhance the life cycle of a game content, induce participation of gamers, prevent gamers from leaving, increase interest, create profits, and the like, and serves as a strategy to provide gamers with better services by performing updates related to adding new characters/scenarios/items, correcting planning/operating data, and marketing events.

Meanwhile, the conventional method of analyzing update effects is checking a variation of a key performance indicator (KPI), such as daily active user (DAU), time spent (TS), and average revenue per user (ARPU) or checking a response of gamers in on/offline communities.

However, such a conventional method cannot analyze a detailed effect and influence of an update on the action of an actual gamer.

SUMMARY OF THE INVENTION

The present invention is directed to providing an apparatus and method for analyzing a game update effect according to a change in a gamer action sequence, capable of providing feedback regarding an effect and an influence of a game service update by analyzing a change in an action sequence of a gamer according to a content update.

The technical objectives of the present invention are not limited to the above, and other objectives may become apparent to those of ordinary skill in the art based on the following descriptions.

According to an aspect of the present invention, there is provided an apparatus for analyzing a game update effect according to a change in a gamer action sequence, the apparatus including: a gamer action information collector configured to collect action information of a gamer from a game operating server that provides a gamer terminal with a game and stores the action information of the gamer therein; a gamer action information sequence identifier configured to detect an action sequence of the gamer from the action information of the gamer collected through the gamer action information collector; and an update result analyzer configured to analyze an consequence on behavior of the gamer with respect to an update of a game service by comparing action sequences of the gamer on the basis of a time point of the update of the game service.

The action information of the gamer collected by the gamer action information collector may include hunting information, hunting location information, item transaction information, item cash purchase information, item function change and enhancement information, and level information of a gamer character.

The apparatus may further include an update information collector configured to collect game service update information from a game service administrator terminal that updates a game. The game service update information may include management information of new character/item, balance patch information, and predicted changed action information of a gamer with respect to the update.

The update result analyzer may analyze a result with respect to an expected effect of the update by comparing the predicted changed action information of the gamer with respect to an update, which is collected through the update information collector, with the action information of the gamer, and provide the game service administrator terminal with the analyzed result as feedback.

The gamer action information collector may only collect the action information of the gamer according to the predicted changed action information of the gamer with respect to the update when the update information is collected from the game service administrator terminal.

The apparatus may further include an action information manager configured to delete the action information of the gamer not matching the predicted changed action information of the gamer from among the collected pieces of the action information of the gamer such that an analysis through the update result analyzer is facilitated.

According to an aspect of the present invention, there is provided a method of analyzing a game update effect according to a change in a gamer action sequence, the method including: collecting, by a gamer action information collector, action information of a gamer from a game operating server that provides a game service and stores the action information of the gamer therein; detecting, by a gamer action information sequence identifier, an action sequence of the gamer from the action information of the gamer collected through the gamer action information collector; and analyzing, by an update result analyzer, a consequence on behavior of the gamer with respect to an update of the game service by comparing action sequences of the gamer detected through the gamer action information sequence identifier, on the basis of a time point of the update of the game service.

The action information of the gamer collected by the gamer action information collector may include hunting information, hunting location information, item transaction information, item cash purchase information, item function change and enhancement information, and level information of a gamer character.

The method may further include collecting, by an update information collector, game service update information from a game service administrator terminal that updates a gamer program operated through the game operating server.

The game service update information may include management information of new character/item, balance patch information, and predicted changed action information of a gamer with respect to an update.

The collecting of action information of the gamer may include only collecting, by the gamer action information collector, the action information of the gamer according to the predicted changed action information of the gamer with respect to the update when the update information is collected from the game service administrator terminal.

The analyzing of the consequence on behavior may include: analyzing, by the update result analyzer, a result with respect to the game service update by matching predicted changed action information of the gamer with respect to the update, which is collected through the update information collector, with the action information of the gamer; and providing the game service administrator terminal with the analyzed result as feedback.

The method may further include deleting, by an action information manager, the action information of the gamer not matching the predicted changed action information of the gamer, which is collected through the update information collector, from among the pieces of the action information of the gamer collected through the gamer action information collector.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a diagram for describing action information of a gamer collected through a gamer action sequence identifier of the embodiment shown in FIG. 2;

FIG. 6 is a reference diagram for describing information about an update plan and an expected effect collected through an update information collector shown in FIG. 5 and;

FIG. 7 is a reference diagram for describing a result with respect to the expected effect of the update analyzed through an update result analyzer shown in FIG. 5;

FIG. 8 is a flowchart showing a method of analyzing a game update effect according to a change in a gamer action sequence according to an embodiment of the present invention; and.

DETAILED DESCRIPTION OF EXEMPLARY EMBODIMENTS

Hereinafter, advantages and features of the present invention, and manners of achieving them will become readily apparent with reference to descriptions of the following detailed embodiments when considered in conjunction with the accompanying drawings. However, the scope of the present invention is not limited to such embodiments, and the present invention may be realized in various forms. The embodiments to be described below are embodiments provided only to complete the disclosure of the present invention and assist those skilled in the art to completely understand the scope of the present invention. The present invention is defined only by the scope of the appended claims. Meanwhile, terms used herein are used to aid in the explanation and understanding of the present invention and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Figure 1:
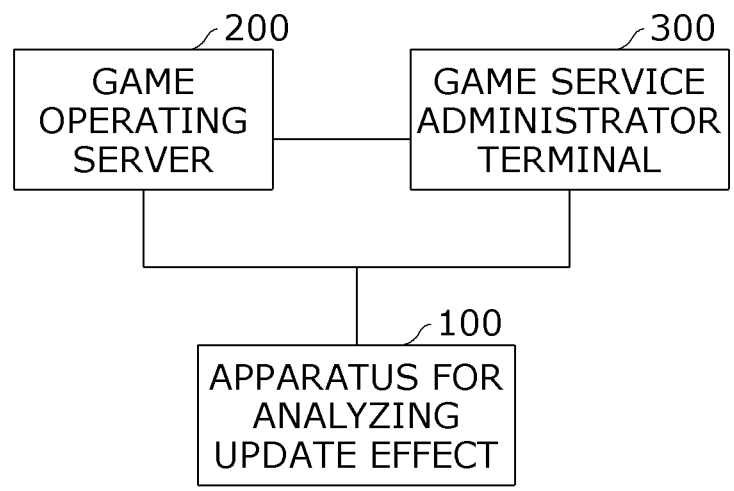
FIG. 1 is a functional block diagram for describing a system for analyzing a game update effect according to a change in a gamer action sequence according to the present invention.

FIG. 1 is a functional block diagram for describing a system for analyzing a game update effect according to a change in a gamer action sequence according to the present invention.

Referring to FIG. 1, a system for analyzing a game update effect according to a change in a gamer action sequence according to the embodiment of the present invention includes an apparatus 100 for analyzing an update effect, a game operating server 200, and a game service administrator terminal 300.

The apparatus 100 for analyzing an update effect serves to collect action information of a gamer from the game operating server 200 to detect an action sequence of the gamer and serves to compare action sequences of the gamer on the basis of a time point of an update of a game service to analyze a consequence on behavior of the gamer with respect to the update of the game service.

In an implementation, the game operating server 200 serves to provide a game service and store action information of the gamer therein. The action information of the gamer may include hunting information, hunting location information, item transaction information, item cash purchase information, item function change and enhancement information, and level information of a gamer character.

The game service administrator terminal 300 serves to provide the game operating server 200 with game service update information such that a game service provided by the game operating server 200 is updated.

Figure 2:
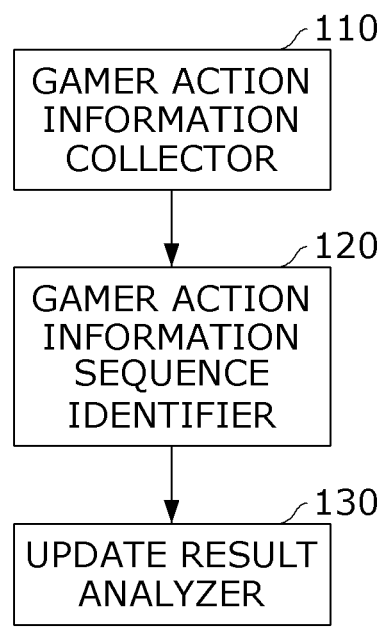
FIG. 2 is a block diagram illustrating a configuration of an embodiment of an apparatus for analyzing a game update effect shown in FIG. 1.

FIG. 2 is a block diagram illustrating a configuration of an embodiment of an apparatus for analyzing a game update effect shown in FIG. 1.

Referring to FIG. 2, the apparatus 100 for analyzing an update effect according to a change in a gamer action sequence according to the embodiment of the present invention includes a gamer action information collector 110, a gamer action information sequence identifier 120, and an update result analyzer 130.

The gamer action information collector 110 serves to collect action information of a gamer from the game operating server 200 that provides a gamer's terminal with a game and stores action information of the gamer therein. The action information of the gamer collected by the gamer action information collector 110 may include hunting information, hunting location information, item transaction information, item cash purchase information, item function change and enhancement information, and level information of a gamer character.

The gamer action information sequence identifier 120 serves to detect an action sequence of the gamer from the action information of the gamer collected through the gamer action information collector 110. That is, the gamer action information sequence identifier 120 detects actions of the gamer, which include hunting information, hunting location information, item transaction information, item cash purchase information, item function change and enhancement information, and level information of a gamer character, in time series while the gamer plays the game.

In addition, the update result analyzer 130 serves to analyze a consequence on behavior of the gamer with respect to an update of the game service by comparing the action sequences of the gamer, which are detected through the gamer action information sequence identifier 120, on the basis of a time point of the update of the game service.

According to the embodiment of the present invention, a change in the action sequence of the gamer before and after the update of the game service is analyzed so that the effect of the game service update is precisely identified.

Figures 4, 5:
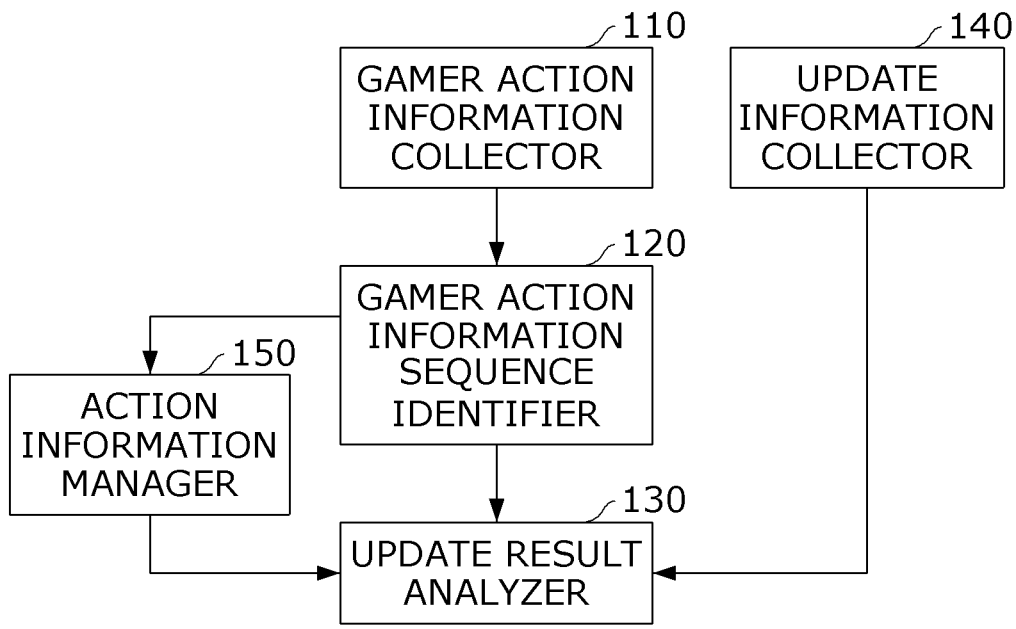
FIG. 4 is a diagram for describing an analysis result of gamer frequent occurrence action sequences before/after an update that are analyzed through an update result analyzer of the embodiment shown in FIG. 2.
FIG. 5 is a block diagram illustrating a configuration of another embodiment of the apparatus for analyzing a game update effect shown in FIG. 1.

FIG. 3 is a diagram for describing gamer action information collected through the gamer action sequence identifier of the embodiment shown in FIG. 2, and FIG. 4 is a diagram for describing an analysis result of gamer frequent occurrence action sequences before/after an update that are analyzed through the update result analyzer of the embodiment shown in FIG. 2.

Referring to FIG. 3, action sequences of Gamer A (User A) are observed for each unit of an action sequence from a "login" to "logout."

The first sequence has a pattern sequence including "login," "hunting," "hunting," "item sales," and "logout," the second sequence has a pattern sequence including "login," "hunting," "hunting," and "logout," and the third sequence has a pattern sequence including "login," "hunting," "death," "hunting," and "logout".

On the other hand, after an update of the game service, the fourth sequence has a pattern sequence including "login," "hunting," "hunting," "item synthesis," and "logout," and the fifth sequence has a pattern sequence including "login," "hunting," "hunting," "purchase with cash," "item synthesis," "dungeon hunting," "level-up," and "logout." The sixth sequence has a pattern sequence including "login," "hunting," "death," "purchase with cash," "weapon/armor enhancement," and "logout."

Accordingly, the update result analyzer 130 analyzes that an action sequence pattern of "hunting" followed by "death" has been reduced by 50%, occurrence of an action sequence pattern of "hunting" followed by "purchase with cash" and "item synthesis" has been increased by 30%, and an action sequence pattern of "purchase with cash" followed by "weapon/armor enhancement" has additionally occurred.

FIG. 5 is a block diagram illustrating a configuration of another embodiment of the apparatus for analyzing a game update effect shown in FIG. 1.

The apparatus for analyzing a game update effect according to the embodiment of the present invention may further include an update information collector 140 in addition to the gamer action information collector 110, the gamer action information sequence identifier 120, and the update result analyzer 130 according to the previous embodiment.

In the embodiment of the present invention, descriptions of parts having the same operations as those of the previous embodiment will be omitted.

Meanwhile, the update information collector 140 serves to collect game service update information from the game service administrator terminal 300 that updates a game. In this case, the game service update information may include update date information and predicted changed action information of a gamer with respect to an update.

FIG. 6 is a reference diagram for describing information about an update plan and an expected effect of the update collected through the update information collector shown in FIG. 5, and FIG. 7 is a reference diagram for describing a result with respect to the expected effect of the update analyzed through the update result analyzer shown in FIG. 5.

In detail, the update information collector 140 may collect game service update information including an update plan "a game administrator performs an update to change a synthesis success probability of Item A from 5% to 10%" and an expected effect "an increase in the number of synthesis attempts by 5%, an increase in the number of dungeon plays by 5%, and an increase in weekly sales by 3%" from the game service administrator terminal 300.

In addition, the update information collector 140 may also collect operation/planning data information of a game service from the game service administrator terminal 300, for example, "Item A is a rare item that is acquired only through a synthesis, the synthesis achieved by synthesizing material B with synthesis recipe C, material B is a material that is only acquired through purchase with cash, and synthesis recipe C is a material that is only acquired as a loot in a dungeon play (hunting)".

On the other hand, the update result analyzer 130 may analyze a result with respect to the expected effect of the update by comparing the predicted changed action information of the gamer, which is included in the game service update information collected through the update information collector 140, with the action information of the gamer, and may provide the game service administrator terminal 300 with the analyzed result as feedback.

That is, referring to FIG. 7, the update result analyzer 130 may check not only the expected effect in the adjustment of the synthesis probability but also the effect derived from the adjustment of the synthesis probability by analyzing the frequent occurrence action sequences of the gamer before/after the update.

For example, a 5% increase in the number of synthesis attempts is a result that coincides with the expected effect of the update, a 10% increase in the number of dungeon plays is a result twice greater than the prediction which is from acquiring enhanced items, a 6% increase in the weekly sales is obtained, and a 3% increase in the action of enhancing weapon/armor leads to additional effects for a success of hunting.

As such, according to the embodiment of the present invention, the result analyzed in any further game service update is provided as feedback to be reflected thereon, and thus is used as an administrator support solution for a game content management policy establishment and a service update that accompany a service operation.

In addition, the embodiment of the present invention does not analyze all action patterns of the gamer, but only analyzes predicted changed action information of the gamer provided in the game service update so that a load of analyzing the action patterns of the gamer is reduced and the update effect and influence of the game service update are analyzed.

On the other hand, the gamer action information collector 110 may only collect action information of the gamer according to the predicted changed action information of the gamer with respect to the update when the update information is collected from the game service administrator terminal 300.

With the gamer action information collector 110 according to the embodiment of the present invention, the update effect and influence of the game service update are precisely analyzed and the burden of analyzing the action patterns of the gamer is reduced.

According to another embodiment of the present invention, an action information manager 150 may delete action information of the gamer not matching the predicted changed action information of the gamer collected through the update information collector 140 from among the pieces of action information of the gamer collected through the gamer action information collector 110 such that the analysis through the update result analyzer 130 is facilitated.

For example, when predicted changed action information of a gamer collected through the update information collector 140 is "login," "hunting," "dungeon hunting," "purchase with cash," and "logout," and action information of the gamer collected through the gamer action information collector 110 is "login," "hunting," "hunting," "dungeon hunting," "purchase with cash," "item sales," and "logout," the action information manager 150 corrects the action information of the gamer to be "login," "hunting," "hunting," "dungeon hunting," "purchase with cash," and "logout," by excluding "item sales".

With the action information manager 150 according to the embodiment of the present invention, a burden of calculating an analysis result of the update information analyzer 140 is reduced even when action information of the gamer that does not match predicted changed action information of the gamer is collected through the gamer action information collector 110.

Figure 8:
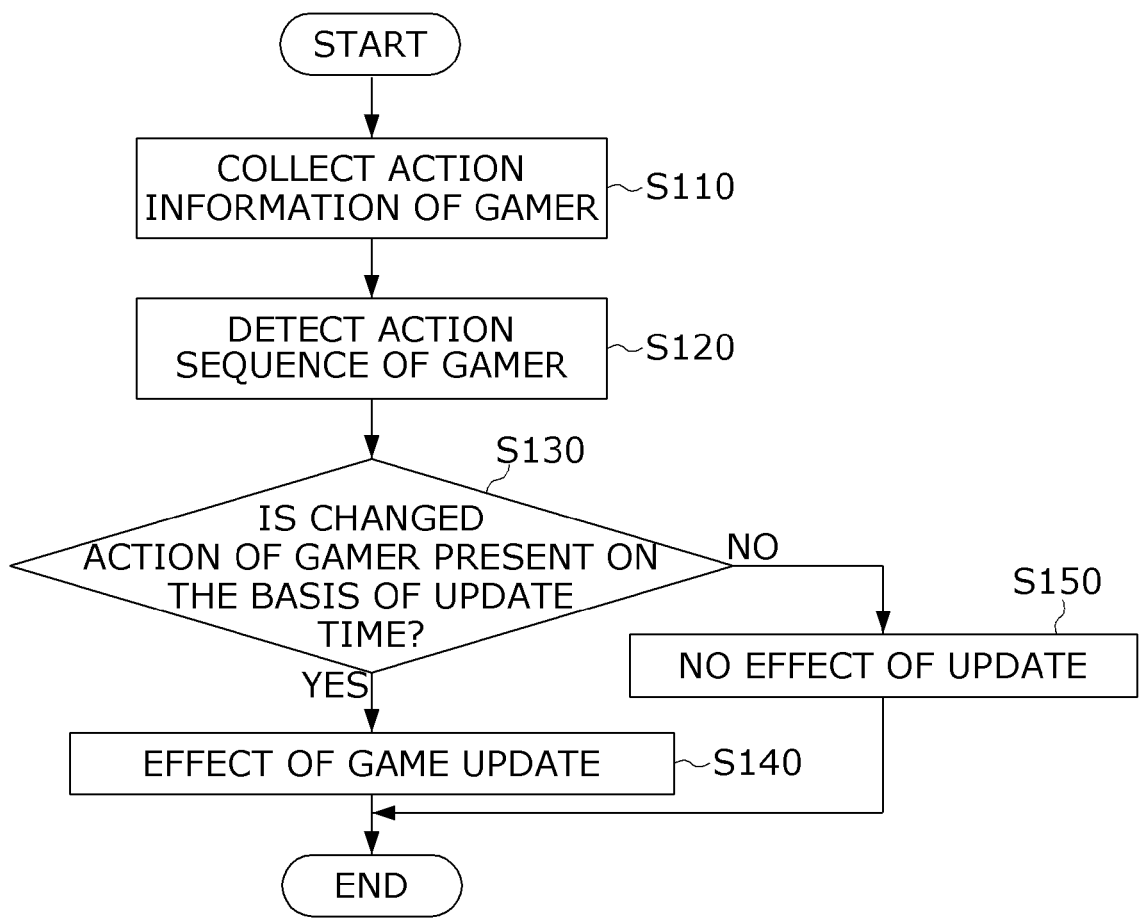

FIG. 8 is a flowchart showing a method of analyzing a game update effect according to a change in a gamer action sequence according to an embodiment of the present invention.

In an implementation, the method of analyzing a game update effect according to a change in a gamer action sequence according to the embodiment of the present invention is performed by the components of the apparatus 100 for analyzing an update effect in connection with the game operating server 200 and the game service administrator terminal 300.

As shown in FIG. 8, the gamer action information collector 110 collects action information of a gamer from the game operating server 200 configured to provide a game service and store action information of the gamer therein (S110). In an implementation, the action information of the gamer may include hunting information, hunting location information, item transaction information, item cash purchase information, item function change and enhancement information, and level information of a gamer character.

Then, the gamer action information sequence identifier 120 detects an action sequence of the gamer from the action information of the gamer, which is collected through the gamer action information collector 110 (S120).

Then, the update result analyzer 130 compares action sequences of the gamer, which are detected through the gamer action information sequence identifier 120, on the basis of a time point of an update of the game service, thereby determining a presence of an changed action performed by the gamer after the update of the game service (S130).

When an changed action performed by the gamer after the update of the game service is present (YES in the determination of operation S130), it is determined that the game service update has an effect (S140).

On the contrary, when the action sequences of the gamer before and after the update of the game service are identical to each other in the determination of operation S130, it is determined that the game service update has no effect (S150).

According to the embodiment of the present invention, the effect of the game service update may be precisely identified by analyzing a change in the action sequences of the gamer before and after the update of the game service.

On the other hand, the gamer action information collector 110 may only collect action information of the gamer according to predicted changed action information of the gamer with respect to the update when the update information is collected from the game service administrator terminal 300.

In addition, according to another embodiment of the present invention, not all action patterns of the gamer are analyzed, but only predicted changed action information of the gamer provided in the game service update is analyzed so that a burden of analyzing the action patterns of the gamer is reduced and the update effect and influence of the game service update are analyzed.

According to the embodiment of the present invention, the action information manager 150 may delete action information of the gamer not matching the collected piece of predicted changed action information of the gamer from among the pieces of action information of the gamer such that the analysis through the update result analyzer 130 is facilitated.

With the action information manager 150 according to the embodiment of the present invention, a load of the update result analyzer 130 is reduced even when action information of the gamer that does not match predicted changed action information of the gamer is collected through the gamer action information collector.

Figure 9:
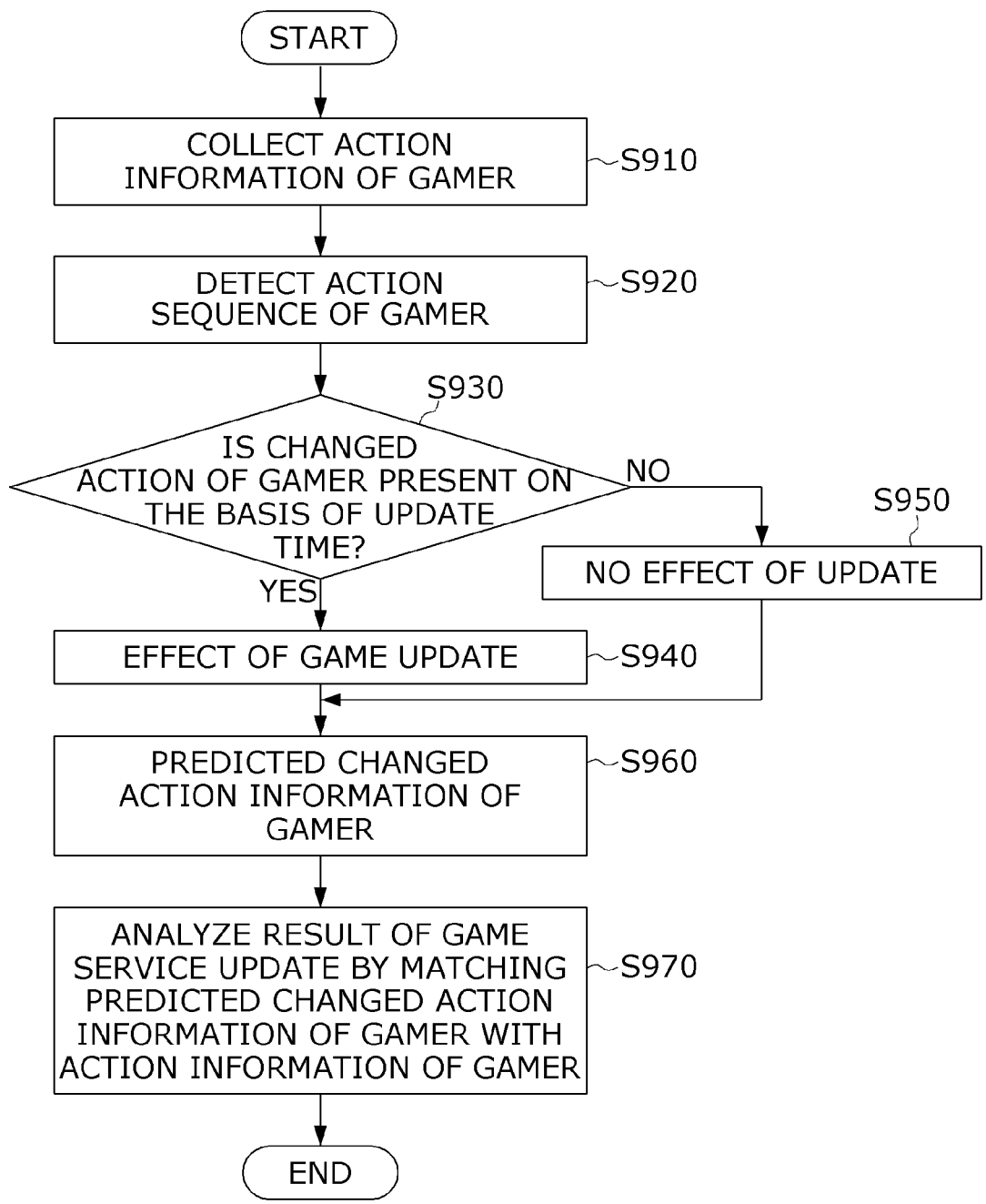
FIG. 9 is a flowchart showing a method of analyzing a game update effect according to a change in a gamer action sequence according to another embodiment of the present invention.

FIG. 9 is a flowchart for describing another embodiment of the present invention. Hereinafter, a method of analyzing a game update effect according to a change in a gamer action sequence according to another embodiment of the present invention will be described with reference to FIG. 9.

First, the gamer action information collector 110 collects action information of a gamer from the game operating server 200 configured to provide a game service and store action information of the gamer therein (S910). In an implementation, the action information of the gamer may include hunting information, hunting location information, item transaction information, item cash purchase information, item function change and enhancement information, and level information of a gamer character.

Then, the gamer action information sequence identifier 120 detects an action sequence of the gamer from the action information of the gamer, which is collected through the gamer action information collector 110 (S920).

Then, the update result analyzer 130 determines a presence of a change in the action sequence of the gamer detected through the gamer action information sequence identifier 120 on the basis of a time point of the game service update (S930).

When the action sequences of the gamer before and after the update of the game service are identical to each other in the determination S930 (YES in the determination of operation S930), it is determined that the game service update has no effect (S940).

On the contrary, when the action sequences of the gamer before and after the update of the game service are different from each other and an changed action performed by the gamer after the update appears (NO in the determination of operation S930), it is determined that the game service update has an effect (S950).

On the other hand, the update information collector 140 collects game service update information from the game service administrator terminal 300 that updates a game program that is operated by the game operating server 200 (S960). The game service update information may include update date information and predicted changed action information of a gamer with respect to an update.

Then, the update result analyzer 130 analyzes a result of the game service update by matching the predicted changed action information of the gamer with respect to the update which is collected through the update information collector 140 with action information of the gamer and provides the game service administrator terminal 300 with the analyzed result as feedback (S970).

An embodiment of the present invention may be implemented in a computer system, e.g., as a computer readable medium.

Figure 10:
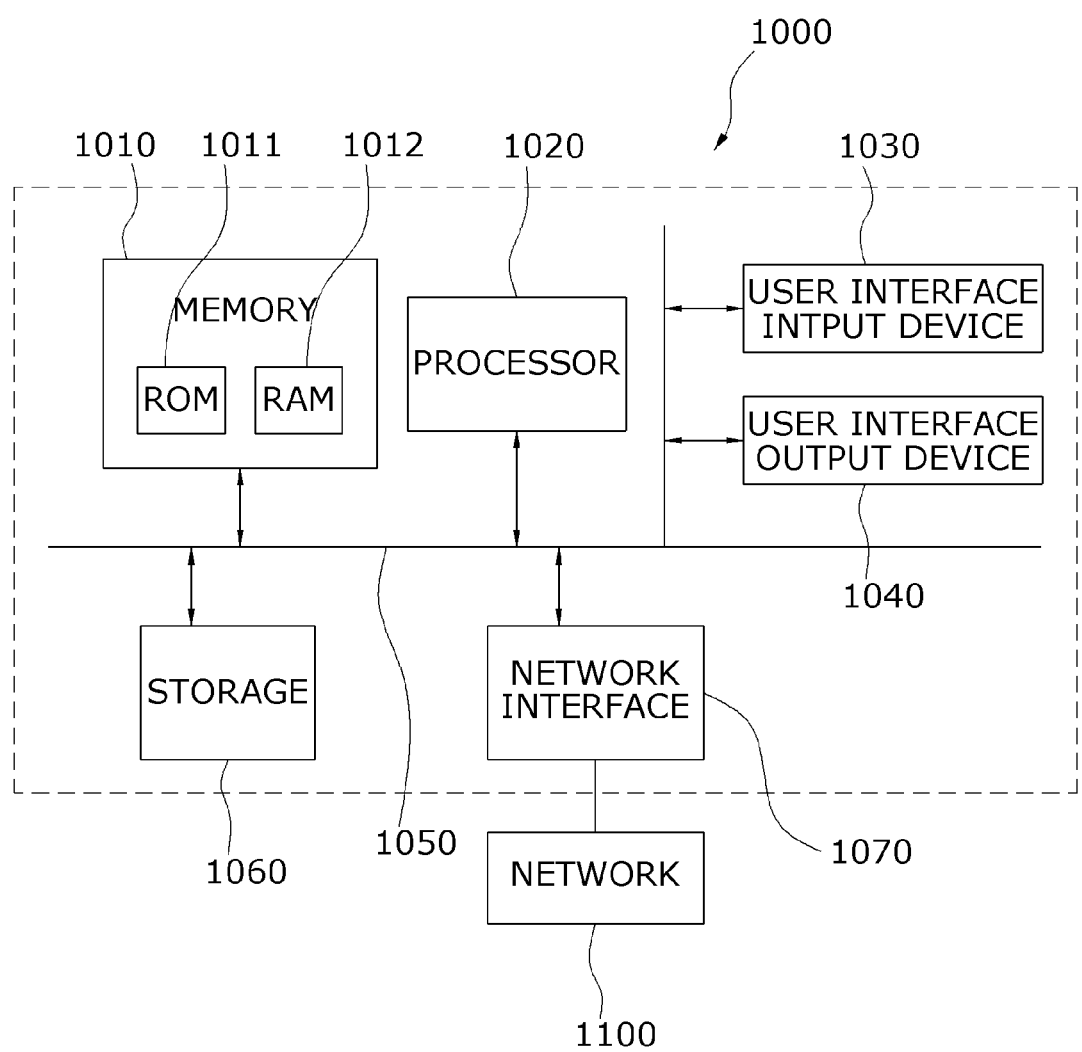
FIG. 10 is a block diagram illustrating a computer system to which the present invention is applied.

FIG. 10 is a block diagram illustrating a computer system to which the present invention is applied.

As shown in FIG. 10, a computer system 1000 may include one or more of a memory 1010, a processor 1020, a user input device 1030, a user output device 1040, and a storage 1060, each of which communicates through a bus 1050. The computer system 1000 may also include a network interface 1070 that is coupled to a network 1100. The processor 720 may be a central processing unit (CPU) or a semiconductor device that executes processing instruction stored in the memory 710 and/or the storage 1060. The memory 1010 and the storage 1060 may include various forms of volatile or non-volatile storage media. For example, the memory 1010 may include a read-only memory (ROM) 1011 and a random access memory (RAM) 1012.

As such, according to the embodiment of the present invention, the result analyzed in any further game service update is provided as feedback to be reflected thereon in any further game service update, and thus is used as an administrator support solution for a game content management policy establishment and a service update that accompany a service operation.

As is apparent from the above, the embodiment of the present invention can precisely check the effect of an update of a game service by comparing and analyzing a change in an action sequence of a gamer before and after a time point of the update of the game service.

Although the exemplary embodiments of the present invention have been described with reference to the accompanying drawings, the exemplary embodiments should be considered in a descriptive sense only and not for purpose of limitation, and those skilled in the art should appreciate that various substitutions, modifications, and changes are possible without departing from the scope and spirit of the present invention. Accordingly, the scope of the present invention is not to be limited by the above embodiments but by the claims and the equivalents thereof.

What is claimed is:

1. An apparatus for analyzing a game update effect according to a change in a gamer action sequence, the apparatus comprising:
   a gamer action information collector configured to collect action information of a gamer from a game operating server that stores the action information of the gamer therein;
   a gamer action information sequence identifier configured to detect an action sequence of the gamer from the collected action information of the gamer; and
   an update result analyzer configured to analyze a consequence on behavior of the gamer with respect to an update of a game service by comparing action sequences of the gamer on the basis of a time point of the update of the game service.

2. The apparatus of claim 1, wherein the action information of the gamer includes at least one piece of hunting information, hunting location information, item transaction information, item cash purchase information, item function change and enhancement information, and level information of a gamer character.

3. The apparatus of claim 1, further comprising an update information collector configured to collect game service update information from a game service administrator terminal that updates a game.

4. The apparatus of claim 3, where the game service update information includes predicted changed action information of the gamer with respect to the update.

5. The apparatus of claim 4, wherein the update result analyzer analyzes a result with respect to an expected effect of the update by comparing the predicted changed action information of the gamer with the action information of the gamer and provides the game service administrator terminal with the analyzed result of the expected effect of the update as feedback.

6. The apparatus of claim 4, wherein the gamer action information collector only collects the action information of the gamer according to the predicted changed action information of the gamer with respect to the update when the update information is collected from the game service administrator terminal.

7. The apparatus of claim 4, further comprising an action information manager configured to delete the action information of the gamer not matching the collected piece of predicted changed action information of the gamer from among the collected pieces of the action information of the gamer.

8. A method of analyzing a game update effect according to a change in a gamer action sequence, the method comprising:
   collecting, by a gamer action information collector, action information of a gamer from a game operating server that provides a game service and stores the action information of the gamer therein;
   detecting, by a gamer action information sequence identifier, an action sequence of the gamer from the collected action information of the gamer; and
   comparing, by an update result analyzer, action sequences of the gamer on the basis of a time point of an update of the game service and analyzing a consequence on behavior of the gamer with respect to the update of the game service.

9. The method of claim 8, wherein the action information of the gamer includes at least one piece of hunting information, hunting location information, item transaction information, item cash purchase information, item function change and enhancement information, and level information of a gamer character.

10. The method of claim 8, further comprising collecting, by an update information collector, game service update information from a game service administrator terminal.

11. The method of claim 10, wherein the game service update information includes at least one piece of predicted changed action information of the gamer with respect to the update.

12. The method of claim 11, wherein the collecting of the action information of the gamer includes only collecting, by the gamer action information collector, the action information of the gamer according to the predicted changed action information of the gamer with respect to the update when the update information is collected from the game service administrator terminal.

13. The method of claim 11, wherein the analyzing of the consequence on behavior includes:
analyzing, by the update result analyzer, a result with respect to the game service update by matching predicted changed action information of the gamer with respect to the update, which is collected through the update information collector, with the action information of the gamer; and
providing the game service administrator terminal with the analyzed result as feedback.

14. The method of claim 11, further comprising deleting, by an action information manager, the action information of the gamer not matching the collected piece of predicted changed action information of the gamer from among the collected pieces of the action information of the gamer.

15. A system for analyzing a game update effect according to a change in a gamer action sequence, the system comprising:
a game operating server configured to provide a game service and store action information of a gamer therein;
a game service administrator terminal configured to provide the game operating server with game service update information; and
an apparatus for analyzing a game update effect configured to collect the action information of the gamer from the game operating server to detect an action sequence of the gamer and to compare action sequences of the gamer on the basis of a time point of an update of the game service to analyze a consequence on behavior of the gamer with respect to the update of the game service.

16. The system of claim 15, wherein the apparatus for analyzing a game update effect includes:
a gamer action information collector configured to collect the action information of the gamer from the game operating server that stores the action information of the gamer therein;
a gamer action information sequence identifier configured to detect the action sequence of the gamer from the collected action information of the gamer; and
an update result analyzer configured to analyze the consequence on behavior of the gamer with respect to the update of the game service by comparing the action sequences of the gamer on the basis of the time point of the update of the game service.

17. The system of claim 16, wherein the action information of the gamer includes at least one piece of hunting information, hunting location information, item transaction information, item cash purchase information, item function change and enhancement information, and level information of a gamer character.

18. The system of claim 16, wherein the apparatus for analyzing a game update effect further includes an update information collector configured to collect the game service update information, which includes predicted changed action information of the gamer, from the game service administrator terminal.

19. The system of claim 18, wherein the update result analyzer analyzes a result with respect to a game service update by matching the predicted changed action information of the gamer with respect to the update, which is collected through the update information collector, with the action information of the gamer, and provides the game service administrator terminal with the analyzed result as feedback.

20. The system of claim 17, wherein the gamer action information collector only collects the action information of the gamer according to predicted changed action information of the gamer with respect to the update when the update information is collected from the game service administrator terminal.

* * * * *